United States Patent [19]

Mori et al.

[11] Patent Number: 4,658,704
[45] Date of Patent: Apr. 21, 1987

[54] BRAKE BOOSTER OF TANDEM TYPE

[75] Inventors: Kohei Mori, Saitama; Haruo Suzuki, Higashimatsuyama, both of Japan

[73] Assignee: Jidoshakiki Co., Ltd., Tokyo, Japan

[21] Appl. No.: 693,564

[22] Filed: Jan. 22, 1985

[30] Foreign Application Priority Data

Jan. 31, 1984 [JP] Japan .............................. 59-12195[U]
Feb. 6, 1984 [JP] Japan .............................. 59-15735[U]
Feb. 6, 1984 [JP] Japan .............................. 59-15736[U]

[51] Int. Cl.4 .............................................. F15B 9/10
[52] U.S. Cl. .................. 91/369 R; 91/376 R
[58] Field of Search .................... 92/48, 49; 91/369 A, 91/369 B, 369 C, 369 R, 376 R; 403/348, 349

[56] References Cited

U.S. PATENT DOCUMENTS

| | | | |
|---|---|---|---|
| 1,199,690 | 9/1916 | Gillan | 403/348 X |
| 3,096,689 | 7/1963 | Kytta | 92/48 |
| 3,152,518 | 10/1964 | Ayers, Jr. | 92/49 |
| 4,173,172 | 11/1979 | Ohmi | 92/48 |
| 4,176,815 | 12/1979 | Davidson et al. | 403/349 |
| 4,279,193 | 7/1981 | Satoh | 92/48 |

FOREIGN PATENT DOCUMENTS 128951 8/1983 Japan .

Primary Examiner—Robert E. Garrett
Assistant Examiner—Mark A. Williamson
Attorney, Agent, or Firm—Flynn, Thiel, Boutell & Tanis

[57] ABSTRACT

A brake booster of tandem type includes a valve body, a rear power piston, a front power piston and a centerbody slidably extending through a centerplate which is centrally disposed within a shell, all of which are integrally connected together by utilizing a hub. An end of the hub located adjacent to the valve body is formed with an engaging portion which extends radially outward, while the shank portion of the valve body is formed with an axial groove which permits the engaging portion to pass there through and is also formed with an engaging recess circumferentially displaced from the axial groove and receiving the engaging portion. The engagement between the engaging portion and the engaging recess allows the hub to be assembled with the valve body while preventing the withdrawal of the hub forwardly from the valve body and also preventing the relative rotation therebetween, all with a greatly simplified construction.

5 Claims, 4 Drawing Figures

BRAKE BOOSTER OF TANDEM TYPE

FIELD OF THE INVENTION

The invention relates to a brake booster of tandem type, and more particularly, to a structure for interconnecting a valve body, a rear power piston and a front power piston and the like which constitute together a brake booster of tandem type.

DESCRIPTION OF THE PRIOR ART

A brake booster of tandem type generally includes a front power piston and a rear power piston which are slidably disposed within a shell, a constant pressure chamber and a variable pressure chamber defined across the respective power piston, and a valve mechanism disposed within a valve body which interconnect the power pistons for switching fluid paths in accordance with the reciprocating movement of an input shaft to supply hydraulic fluid to the variable pressure chamber. The valve mechanism also includes a valve plunger which is prevented from withdrawal from the valve body by means of a forked key member inserted into a bore formed in the valve body and engaging with the plunger.

In a brake booster of tandem type as mentioned above, it is necessary that at least the valve body, the rear power piston and the front power piston be integrally connected together, and a variety of interconnecting structures have been proposed. In one interconnecting structure of the prior art, as disclosed in Japanese Patent Application No. 10,314/1982(Japanese Laid-Open Patent Application No. 128,951/1983), a hub is surrounded by the valve body and has its end engaged and connected with the valve body. In the mentioned prior structure, the rear power piston, a centerbody which slidably extends through a centerplate and the front power piston are assembled with the hub in a sequential manner, and finally a nut is threadably engaged with the front end of the hub so as to hold these components connected together in a sandwiched manner between the hub and the valve body.

When interconnecting the rear power piston, the centerbody and the front power piston between the end of the hub and the nut, it is necessary that the withdrawal of the end of the hub from the valve body must be prevented when tightening the nut. At the same time, if the nut is tightened under the condition that the valve body is supported in order to facilitate the nut tightening operation, it is necessary to connect at least the hub so as to be incapable of rotating with respect to the valve body, thus preventing the rotation of the hub together with the nut. However, the required procedure of the prior art has been complex and expensive, and the assembling operation had a low efficiency.

The front power piston is generally shaped in the form of a dish, and the nut which is threadably engaged with the hub is located on the front surface of the front power piston which is dish-shaped, resulting in the hut projecting axially from the front surface thereof. Accordingly, the abutment of the nut against the front shell must be prevented by increasing the overall length of the brake booster of tandem type.

When integrally connecting the valve body and the power pistons with the hub interposed, these components are required to exhibit corresponding strengths. However, the valve body is frequently formed of a synthetic resin, and this tends to present a problem that cracks are likely to occur in the vicinity of a bore which is formed in the valve body to allow the key member to be inserted the resin. In particular, the recent trend is to provide a key member which is mechanically interlocked with the valve plunger so as to be axially reciprocable with respect to the valve body in order to reduce the lost motion stroke during the initial phase of operation of the brake booster. If the axial size of the bore is increased at this end, the tendency for the cracks to occur increases further, presenting a difficulty in reducing the size and weight of the valve body.

SUMMARY OF THE INVENTION

It is an object of the invention to provide a brake booster of tandem type which is simple in construction and capable of preventing the withdrawal of a hub from a valve body and in which the relative rotation between the hub and the valve body can be prevented while allowing the hub to be assembled with the valve body in a greatly facilitated manner.

Such object is achieved in accordance with the invention by providing an engaging portion on an end of the hub which extends radially outward while an axial groove is formed in the shank portion of the valve body to permit the engaging portion to pass therethrough. An engaging recess is formed in the shank portion of the valve body at a location which is circumferentially offset from the axial groove for engagement with the engaging portion. The engagement between the engaging portion and the engaging recess prevents the withdrawal of the hub from the body in a forward direction and simultaneously prevents the relative rotation therebetween.

According to another feature of the invention, the shank portion of the front power piston is provided with a sleeve which extends toward the rear power piston to allow the nut to be threadably engaged with the hub within the region of the sleeve, thus preventing the nut from projecting from the front surface of the front power piston and thus allowing a corresponding reduction in the overall length.

According to a further feature of the invention, a bridge axially extends across the bore formed in the valve body so as to provide an integral connection between parts of the valve body which are located across the bore to increase the strength of the bore region, at an intermediate position of the forked portion of the key member which is used to prevent the valve plunger from being withdrawn from the valve body.

Other objects, features and advantages of the invention will become apparent from the following description with reference to the attached drawings.

DETAILED DESCRIPTION OF EMBODIMENTS

Figure 1:
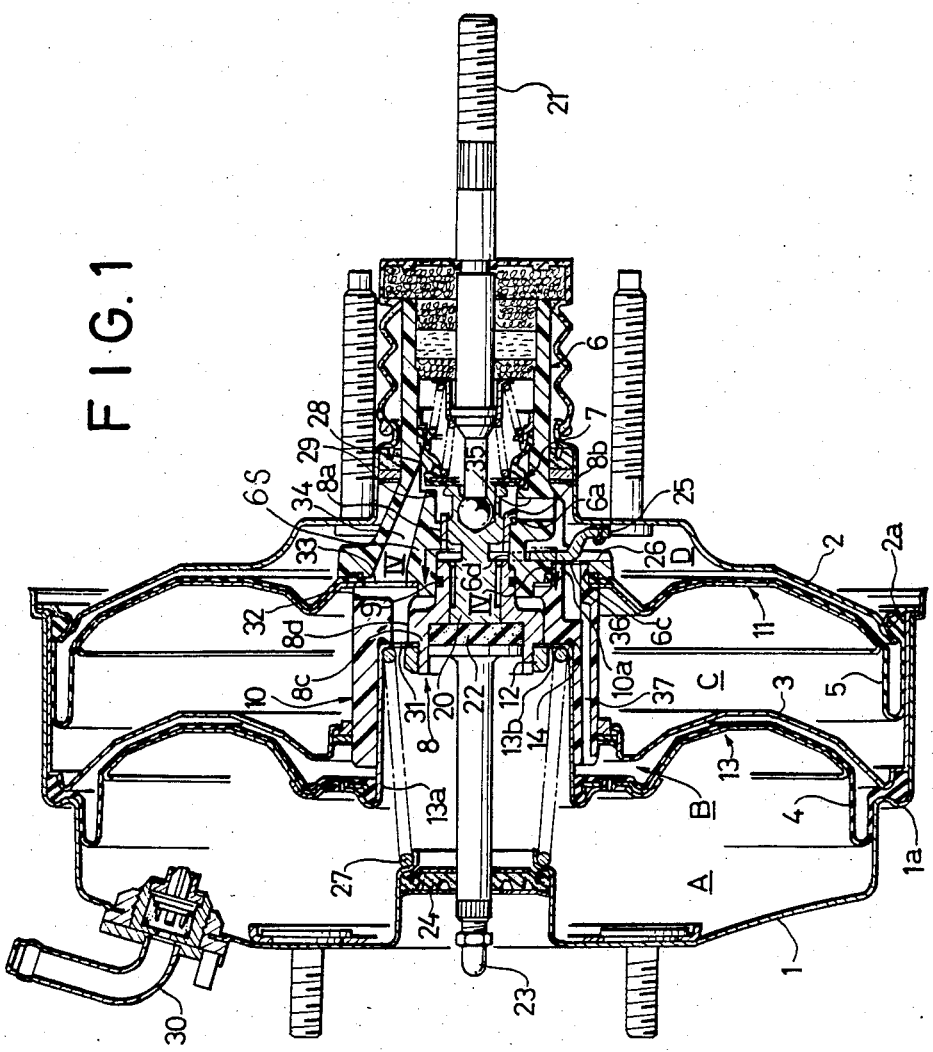
FIG. 1 is a longitudinal section of one embodiment of the invention.

Referring to FIG. 1, there is shown a brake booster of tandem type according to one embodiment of the invention. The brake booster includes a front shell 1 and a rear shell 2, both of which are combined to define an enclosed vessel. A centerplate 3 is centrally disposed within the vessel, and a front diaphragm 4 and a rear diaphragm 5 are disposed on the opposite sides of the centerplate 3 to divide the interior of the vessel into four chambers A, B, C and D which are located in a sequential manner, as viewed from the front side. The front shell is generally cup-shaped and includes a cylindrical portion which is formed with a step 1a intermediate its length, thereby providing a front portion of a reduced diameter.

The centerplate 3 is fitted inside the front shell 1 and is cup-shaped having a depth which is substantially equal to one-half the depth of the cup configuration of the front shell 1. The peripheral portion of the front surface of the centerplate 3 is disposed in axially opposing relationship with the step 1a formed in the front shell 1 to hold the periphery of the front diaphragm 4 sandwiched therebetween. The rear shell 2 is dish-shaped and has an annular engaging groove 2a formed in its outer peripheral area, and the outer periphery of the rear diaphragm 5 is held sandwiched between the inner surface of the engaging groove 2a and the inner surface of the sleeve portion of the centerplate 3.

A valve body 6 which is formed of a synthetic resin internally houses a valve mechanism 7 which is in itself well known in the art. The valve body 6 has a shank portion, in which a hub 8 formed of a metal material is fitted in a hermetically sealed manner by means of a sealed member 9. The hub 8 has a right end 8a of a reduced diameter, the free end of which is integrally formed with engaging portions 8b, which are adapted to be engaged with engaging recesses 6a formed in the valve body 6, thus preventing the hub 8 from being withdrawn to the left and simultaneously preventing the relative rotation between the valve body 6 and the hub 8.

Figure 2:
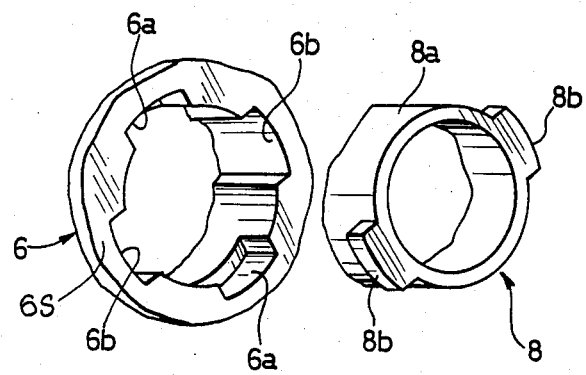
FIG. 2 is an exploded perspective view of the connection between a valve body and a hub.
Figure 3:
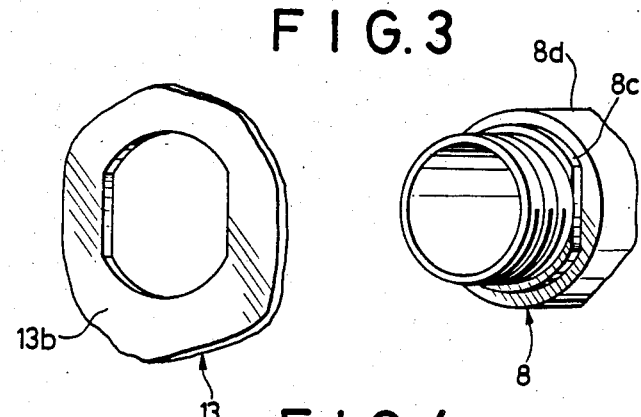
FIG. 3 is an exploded perspective view of the connection between a front power piston and the hub.

Referring to FIG. 2, it will be seen that the engaging portions 8b formed on the hub 8 project radially outward from the free end of the reduced diameter portion 8a of the hub 8 at diametrically opposite points. On the other hand, the valve body 6 is formed with axial grooves 6b which allow the engaging portions 8b to pass therethrough. In addition, the valve body 6 is formed with the engaging recesses 6a which are 90° displaced from the axial grooves 6b for receiving the engaging portions 8b. Accordingly, by passing the engaging portions 8b of the hub 8 through the axial grooves 6b and then rotating the hub 8 through 90°, the engaging portions 8b may be engaged with the recesses 6a, thus preventing the withdrawal of the hub 8 from the body 6 and simultaneously preventing the relative rotation between the hub 8 and the valve body 6.

A centerbody 10 formed of a synthetic resin is fitted around the hub 8, and has a right end face which is disposed in opposing relationship with the left end face of the valve body 6 so as to hold the inner peripheries of the rear diaphragm 5 and a rear power piston 11 sandwiched therebetween. On the other hand, the inner periphery of a front power piston 13 is held between the left end face or a shoulder on the internal surface of the shank portion of the centerbody 10 and a nut 12 which is threadably engaged with the hub 8, and a hermetic seal therebetween is maintained by means of a seal member 14. When the nut 12 is tightened under this condition, the valve body 6, the rear diaphragm 5, the rear power piston 11, the centerbody 10, and the front power piston 13 are mutually and integrally connected together between the engaging portions 8b on the hub 8 and the nut 12.

On its right end face, the centerbody 10 is formed with a projection 10a, which is engaged with a recess 6c formed in the left end face of the valve body 6, thus achieving a connection which prevents a relative rotation between the valve body 6 and the centerbody 10. At the same time, the projection 10a also extend through the rear power piston 11 and the rear diaphragm 5, whereby the relative rotation of the rear power piston 11 is prevented, with the rear diaphragm 5 maintaining a hermetic seal in such region.

The shank portion of the front power piston 13 is shaped as a sleeve 13a which extends toward the rear power piston 11 and which is fitted inside the shank portion of the centerbody 10. The sleeve 13a continues to a flange 13b which extends radially inward and which is engaged with an anti-rotation step 8c of oblong configuration which is shaped in the hub 8 adjacent to the threaded portion, thus preventing the relative rotation therebetween.

Accordingly, the combinations of the hub 8 and the front power piston 13, of the valve body 6 and the centerbody 10 and the rear power piston 11 are rotationally fixed relative to each other, so that when the nut 12 is tightened under the condition that the front power piston 13 is supported and fixed, these components are prevented from rotating relative to each other.

The valve mechanism 7 comprises a valve plunger 20 which is slidably fitted within the right end portion 8a of a reduced diameter of the hub 8. The free end of the valve plunger 20 is connected to an input shaft 21 which is mechanically interlocked with a brake pedal, not shown, while the opposite end is disposed in opposing relationship with the end face of a reaction disc 22 which is disposed within a portion 8d of the hub 8 which has an increased diameter. The other end face of the reaction disc 22 is disposed in contact with the right end face of a push rod 23 which is slidably fitted in the portion 8d of the hub 8. The free end of the push rod 23 extends through a seal member 24 and projects externally through the shank portion of the front shell in a slidable manner.

Figure 4:
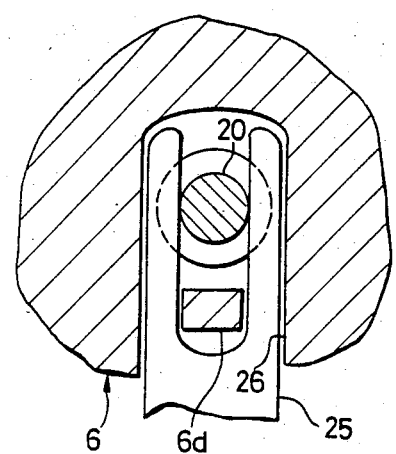
FIG. 4 is a cross section taken along the line IV—IV shown in FIG. 1.

A key member 25 which acts to prevent the valve plunger 20 from being withdrawn from the hub 8 radially extends through the valve body 6 and the hub 8 and is mechanically coupled to the valve plunger 20, suitable means being provided (not shown) which prevents the key member 25 from being disengaged from the valve body 6. Referring to FIGS. 1 and 4, it will be noted that the valve body 6 is formed with a radial bore 26 into which the key member 25 may be inserted. It will also be noted that a bridge 6d is integrally formed with the valve body 6 to extend across the bore 26 between the both limbs of the forked key member 25, the bridge 6d increasing the strength of the valve body 6.

The key member 25 is disposed in the valve body 6 and the hub 8 so as to be slidable in the axial direction thereof. When the valve body 6 and the power pistons 11, 13 are maintained in their non-operative position shown under the resilience of a return spring 27, the key member 25 abuts against the internal wall surface of the rear shell 2 to allow the valve plunger 20 and the input shaft 21 to be advanced from their free retracted positions to bring a valve element 28 of the valve mechanism 7 close to a valve seat 29, thus permitting a lost motion stroke of the input shaft 21 to be reduced during the initial phase of operation.

The chamber A represents a constant pressure chamber into which a negative pressure is introduced and maintained. The chamber A communicates with an intake manifold, not shown, through a negative pressure duct 30 which is mounted in the front shell 1. The constant pressure chamber A is maintained in communication with another constant pressure chamber C through an opening 31 formed in the flange 13b of the front power piston 13 and through a first passage 32 formed in the centerbody 10.

When the brake booster is non-operative, the constant pressure chamber A and C communicate with a variable pressure chamber D through a hole 33 formed in the rear power piston 11, a passage 34 formed in the valve body 6, the clearance between the valve element 28 and the valve seat 29 of the valve mechanism 7 and a radial passage 35 formed in the valve body 6. The constant pressure chambers A and C also communicate with another variable pressure chamber B through a passage 36 formed in the valve body 6 and a second passage 37 formed in the centerbody 10.

Under this condition, a negative pressure is introduced into the constant pressure chambers A and C and the variable pressure chambers B and D, all of which have an equal pressure. Hence, there is no pressure differential across each of the diaphragms 4 and 5, which are therefore maintained in their non-operative positions shown by means of the return spring 27.

In the described embodiment, the engaging portions 8b formed on the right end portion 8a of the hub 8 may be passed through the axial grooves 6b, formed in the shank portion of the valve body 6 until they project beyond the right-hand end of the axial grooves 6b, and then the hub 8 may be turned though 90° to bring the engaging portions 8b into engagement with the recesses 6a, whereupon the withdrawal of the hub from the valve body 6 is prevented and simultaneously the relative rotation between the hub 8 and the valve body 6 is prevented, both in a greatly facilitated manner.

Since the relative rotation between the valve body 6 and the centerbody 10 is prevented by the engagement between the extension 10a and the recesses 6c and since the relative rotation between the hub 8 and the front power piston 13 is prevented by the step 8c having an oblong configuration which is formed on the hub 8, it will be seen that when the nut 12 is tightened by manually supporting and fixing the front power piston 13, the relative rotation between these components is prevented to assure a positive tightening operation.

In the described embodiment, the passages 32, 33 and 37 are formed in the centerbody 10 for providing communications between the constant pressure chambers A and C and the variable pressure chambers B and D, so that the centerbody 10 and the valve body 6 require to be positioned relative to each other in the rotational direction. However, the need for such rotational positioning of the centerbody 10 and the valve body 6 is avoided where these passages are formed in the portions of the shells 1 and 2 are located adjacent to the outer periphery, for example, as is well known in the art. Where the nut 12 is tightened while supporting the valve body 6 instead of supporting the front power piston 13, it is only necessary that the hub 8 the valve body 6 be connected in the direction of rotation.

While the invention has been shown and described above in terms of a preferred embodiment thereof, it should be understood that a number of changes, modifications and substitutions will readily occur to one skilled in the art without departing from the spirit and scope of the invention as defined by the appended claims.

What is claimed is:

1. A brake booster of tandem type comprising a valve body having a tubular shank portion, a hub fitted in the shank portion of the valve body in a manner to prevent the withdrawal of the hub forwardly from the valve body, a centerbody fitted around the hub and slidably extending through a centerplate and serving to hold a rear power piston between it and the valve body, and a front power piston held between the centerbody and a nut which is threadably engaged with one end of the hub; wherein the other end of the hub is formed with an engaging portion which projects radially outward while the shank portion of the valve body is formed with an axial groove which permits the engaging portion to pass therethrough and is also formed with an engaging recess which is circumferentially displaced from the axial groove for receiving the engaging portion, the engagement between the engaging portion and the engaging recess being effective to prevent the withdrawal of the hub forwardly from the valve body and simultaneously to prevent relative rotation between the hub and the valve body, the front power piston having a shank portion formed as a sleeve which extends toward the rear power piston and which is fitted inside the centerbody, the end of the sleeve adjacent to the rear power piston being formed as a flange which extends radially inward, the one end of the hub extending through the flange, the nut being threadably engaged with the one end of the hub within the sleeve.

2. A brake booster according to claim 1 wherein the one end of the hub is formed with a non-circular step which is effective to prevent relative rotation between the hub and front power piston, the flange being formed with an opening which conforms to the configuration of the step, the engagement between the opening and the step being effective to provide an integral connection between the hub and the front power piston as considered in the direction of the rotation.

3. A brake booster of tandem type comprising a valve body having a tubular shank portion, a hub fitted in the shank portion of the valve body in a manner to prevent the withdrawal of the hub forwardly from the valve body, a centerbody fitted around the hub and slidably extending through a centerplate and serving to hold a rear power piston between it and the valve body, a front power piston held between the centerbody and a nut which is threadably engaged with one end of the hub; wherein the other end of the hub is formed with an engaging portion which projects radially outward while the shank portion of the valve body is formed with an axial groove which permits the engaging portion to pass therethrough and is also formed with an engaging recess which is circumferentially displaced from the axial groove for receiving the engaging portion, the engagement between the engaging portion and the engaging recess being effective to prevent the withdrawal of the hub forwardly from the valve body and simultaneously to prevent relative rotation between the hub and the valve body, a valve mechanism which switches a fluid circuit in accordance with the reciprocating movement of an input shaft comprises a valve plunger, a forked key member being inserted into a bore formed in the valve body to prevent the withdrawal of the valve plunger from the valve body, the valve body being integrally formed with a bridge which axially extends across the bore formed therein, said bridge being received at an intermediate portion of the inserted forked key member, namely at a position between the valve plunger and a closed end of a slot defining the forking of said forked member.

4. A brake booster according to claim 3 wherein the key member is reciprocable in the axial direction of the valve body and can be brought into abutment against the inner wall surface of a shell, whereby when the key member abuts against the inner wall surface of the shell, the key member causes the valve plunger to be advanced from its free retracted position by a given amount.

5. A brake booster according to claim 3 wherein said valve body is of synthetic resin material.

* * * * *